United States Patent
Masuda et al.

(10) Patent No.: US 7,092,711 B2
(45) Date of Patent: Aug. 15, 2006

(54) NEIGHBOR CELL NOTIFYING APPARATUS AND NEIGHBOR CELL NOTIFYING METHOD

(75) Inventors: Masafumi Masuda, Yokosuka (JP); Kota Fujimura, Yokosuka (JP); Yutaka Ohto, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 170 days.

(21) Appl. No.: 10/726,540

(22) Filed: Dec. 4, 2003

(65) Prior Publication Data

US 2004/0166858 A1  Aug. 26, 2004

(30) Foreign Application Priority Data

Dec. 6, 2002  (JP) ............................. 2002-355401

(51) Int. Cl.
*H04Q 7/20* (2006.01)

(52) U.S. Cl. ...................... 455/439; 455/434; 370/331

(58) Field of Classification Search ................ 455/434, 455/436, 437, 439, 453; 370/331
See application file for complete search history.

(56) References Cited

U.S. PATENT DOCUMENTS

| | | | |
|---|---|---|---|
| 5,946,621 A | | 8/1999 | Chheda et al. |
| 5,982,758 A | | 11/1999 | Hamdy et al. |
| 6,119,005 A | * | 9/2000 | Smolik ........................ 455/436 |
| 6,360,098 B1 | | 3/2002 | Ganesh et al. |
| 6,400,951 B1 | * | 6/2002 | Vaara .......................... 455/436 |
| 6,836,471 B1 | * | 12/2004 | Holma et al. ................ 370/331 |
| 2003/0190916 A1 | * | 10/2003 | Celedon et al. ............. 455/437 |

\* cited by examiner

*Primary Examiner*—Jean Gelin
*Assistant Examiner*—Julie E Stein
(74) *Attorney, Agent, or Firm*—Oblon, Spivak, McClelland, Maier & Neustadt, P.C.

(57) ABSTRACT

There is provided a neighbor cell notifying apparatus capable of implementing more efficient notification to a mobile station within a range that can be notified of and monitored, when the mobile station in communication using a plurality of cells is notified of neighbor cell information. This neighbor cell notifying apparatus includes a cell information extracting part for extracting neighbor cell information items for specifying respective neighbor cells corresponding to each of the cells; a cell rank determining part for, based on the neighbor cell information items extracted, determining ranks of neighbor cell information items that the mobile station is to be notified of, in favor of neighbor cell information items about neighbor cells common to the cells; and a cell information notifying part for notifying the mobile station of a predetermined number of neighbor cell information items among the neighbor cell information items on the basis of the ranks determined.

7 Claims, 9 Drawing Sheets

Fig.3A

| CELL NAME | CELL ID |
|---|---|
| CELL A201 | 1 |
| CELL A202 | 2 |
| CELL A203 | 3 |
| CELL A204 | 4 |
| CELL A205 | 5 |
| CELL A206 | 6 |
| CELL A207 | 7 |
| CELL A208 | 8 |
| CELL A209 | 9 |

Fig.3B

| CELL NAME | CELL ID |
|---|---|
| CELL B301 | 7 |
| CELL B302 | 10 |
| CELL B303 | 11 |
| CELL B304 | 12 |
| CELL B305 | 13 |
| CELL B306 | 6 |
| CELL B307 | 1 |
| CELL B308 | 8 |
| CELL B309 | 14 |

*Fig.4A*

| CELL NAME | CELL ID |
|---|---|
| CELL A201 | 1 |
| CELL B301 | 7 |
| CELL A202 | 2 |
| CELL B302 | 10 |
| CELL A203 | 3 |
| CELL B303 | 11 |
| CELL A204 | 4 |
| CELL B304 | 12 |
| CELL A205 | 5 |
| CELL B305 | 13 |
| CELL A206 | 6 |
| CELL B306 | 6 |
| CELL A207 | 7 |
| CELL B307 | 1 |
| CELL A208 | 8 |
| CELL B308 | 8 |
| CELL A209 | 9 |
| CELL B309 | 14 |

*Fig.4B*

| CELL NAME | CELL ID |
|---|---|
| CELL A201 | 1 |
| CELL B301 | 7 |
| CELL A206 | 6 |
| CELL A208 | 8 |
| CELL A202 | 2 |
| CELL B302 | 10 |
| CELL A203 | 3 |
| CELL B303 | 11 |
| CELL A204 | 4 |
| CELL B304 | 12 |

Fig.6A

| CELL NAME | CELL ID | PRIORITY |
|---|---|---|
| CELL A201 | 1 | 1 |
| CELL A202 | 2 | 2 |
| CELL A203 | 3 | 8 |
| CELL A204 | 4 | 3 |
| CELL A205 | 5 | 6 |
| CELL A206 | 6 | 4 |
| CELL A207 | 7 | 9 |
| CELL A208 | 8 | 5 |
| CELL A209 | 9 | 7 |

Fig.6B

| CELL NAME | CELL ID | PRIORITY |
|---|---|---|
| CELL B301 | 7 | 1 |
| CELL B302 | 10 | 2 |
| CELL B303 | 11 | 8 |
| CELL B304 | 12 | 3 |
| CELL B305 | 13 | 6 |
| CELL B306 | 6 | 4 |
| CELL B307 | 1 | 9 |
| CELL B308 | 8 | 5 |
| CELL B309 | 14 | 7 |

Fig.7A

| CELL NAME | CELL ID | PRIORITY |
|---|---|---|
| CELL A201 | 1 | 1 |
| CELL B301 | 7 | 1 |
| CELL A202 | 2 | 2 |
| CELL B302 | 10 | 2 |
| CELL A203 | 3 | 8 |
| CELL B303 | 11 | 8 |
| CELL A204 | 4 | 3 |
| CELL B304 | 12 | 3 |
| CELL A205 | 5 | 6 |
| CELL B305 | 13 | 6 |
| CELL A206 | 6 | 4 |
| CELL B306 | 6 | 4 |
| CELL A207 | 7 | 9 |
| CELL B307 | 1 | 9 |
| CELL A208 | 8 | 5 |
| CELL B308 | 8 | 5 |
| CELL A209 | 9 | 7 |
| CELL B309 | 14 | 7 |

Fig.7B

| CELL NAME | CELL ID | PRIORITY |
|---|---|---|
| CELL A201 | 1 | 1 |
| CELL B301 | 7 | 1 |
| CELL A202 | 2 | 2 |
| CELL B302 | 10 | 2 |
| CELL A203 | 3 | 8 |
| CELL B303 | 11 | 8 |
| CELL A204 | 4 | 3 |
| CELL B304 | 12 | 3 |
| CELL A205 | 5 | 6 |
| CELL B305 | 13 | 6 |
| CELL A206 | 6 | 4 |
| CELL A208 | 8 | 5 |
| CELL A209 | 9 | 7 |
| CELL B309 | 14 | 7 |

Fig.7C

| CELL NAME | CELL ID | PRIORITY |
|---|---|---|
| CELL A201 | 1 | 1 |
| CELL B301 | 7 | 1 |
| CELL A202 | 2 | 2 |
| CELL B302 | 10 | 2 |
| CELL A204 | 4 | 3 |
| CELL B304 | 12 | 3 |
| CELL A206 | 6 | 4 |
| CELL A208 | 8 | 5 |
| CELL A205 | 5 | 6 |
| CELL B305 | 13 | 6 |

Fig.9A

| CELL NAME | CELL ID | PRIORITY |
|---|---|---|
| CELL A201 | 1 | 1 |
| CELL B301 | 7 | 1 |
| CELL A202 | 2 | 2 |
| CELL B302 | 10 | 2 |
| CELL A203 | 3 | 8 |
| CELL B303 | 11 | 8 |
| CELL A204 | 4 | 3 |
| CELL B304 | 12 | 3 |
| CELL A205 | 5 | 6 |
| CELL B305 | 13 | 6 |
| CELL A206 | 6 | 4 |
| CELL B306 | 6 | 4 |
| CELL A207 | 7 | 9 |
| CELL B307 | 1 | 9 |
| CELL A208 | 8 | 5 |
| CELL B308 | 8 | 5 |
| CELL A209 | 9 | 7 |
| CELL B309 | 14 | 7 |

Fig.9B

| CELL NAME | CELL ID | PRIORITY |
|---|---|---|
| CELL A201 | 1 | 1 |
| CELL B301 | 7 | 1 |
| CELL A206 | 6 | 4 |
| CELL A208 | 8 | 5 |
| CELL A202 | 2 | 2 |
| CELL B302 | 10 | 2 |
| CELL A203 | 3 | 8 |
| CELL B303 | 11 | 8 |
| CELL A204 | 4 | 3 |
| CELL B304 | 12 | 3 |
| CELL A205 | 5 | 6 |
| CELL B305 | 13 | 6 |
| CELL A209 | 9 | 7 |
| CELL B309 | 14 | 7 |

Fig.9C

| CELL NAME | CELL ID | PRIORITY |
|---|---|---|
| CELL A201 | 1 | 1 |
| CELL B301 | 7 | 1 |
| CELL A206 | 6 | 4 |
| CELL A208 | 8 | 5 |
| CELL A202 | 2 | 2 |
| CELL B302 | 10 | 2 |
| CELL A204 | 4 | 3 |
| CELL B304 | 12 | 3 |
| CELL A205 | 5 | 6 |
| CELL B305 | 13 | 6 |

NEIGHBOR CELL NOTIFYING APPARATUS AND NEIGHBOR CELL NOTIFYING METHOD

BACKGROUND OF THE INVENTION

1. Field of the Invention

The present invention relates to a neighbor cell notifying apparatus and a neighbor cell notifying method for notifying a mobile station of predetermined information in a mobile communication network for implementing wireless communication utilizing a plurality of cells between the mobile station and a base station.

2. Related Background Art

The W-CDMA (Wideband-Code Division Multiple Access) system, or the UMTS (Universal Mobile Telecommunications System) in IMT-2000 (International Mobile Telecommunications-2000) being a typical mobile communication system adopts DHO (Diversity HandOver) to implement communication simultaneously using a plurality of cells and effect combination and selection of signals, thereby improving the quality. In the W-CDMA system, or the UMTS, information about neighbor cells for a mobile station under communication to monitor in preparation for handover is retained as system data or the like at a radio control station, and the mobile station under communication is notified of the information by a message. Neighbor cell information items corresponding to the respective cells are transmitted to the mobile station under communication using the plurality of cells in DHO.

There is sometimes a limit to the total number of neighbor cells that can be notified of and monitored, from performance restrictions at the mobile station. Therefore, in the case of the communication using a plurality of cells in DHO, there is a technique of extracting duplicate cells among the neighbor cell information items of the cells and avoiding transmission of the neighbor cell information items about the duplicate cells, in order to increase information efficiency of the neighbor cell information transmitted from the radio control station to the mobile station.

SUMMARY OF THE INVENTION

Described below is an example of the notification of the neighbor cell information by the conventional technique. It is assumed that the total number of neighbor cells that can be notified of and monitored is ten, from the performance restrictions at the mobile station. It is also assumed that the mobile station is in communication using two cells and that there are nine neighbor cells to each of the two cells used in the communication. Duplicate cells among the neighbor cells are assumed to be four cells. Therefore, the number of neighbor cell information items to be notified of is 14. However, the total number of neighbor cells that can be notified of and monitored is ten, and there are still four cells in excess. Namely, there is the problem to be solved that the neighbor cell information still exceeds the total number of neighbor cells that can be notified of and monitored, even after the elimination of the information about the duplicate cells among the neighbor cells.

It is, therefore, an object of the present invention to provide a neighbor cell notifying apparatus and a neighbor cell notifying method capable of implementing more efficient notification to the mobile station within the range that can be notified of and monitored, when the mobile station in communication using plural cells is notified of the neighbor cell information.

The Inventors conducted various investigations for solving the foregoing problem. For example, in the case where the neighbor cell information to be notified of was that about fourteen cells while the total number of neighbor cells that could be notified of and monitored was ten, just as in the case of the aforementioned example, we investigated a technique of deleting four posterior cells and notifying the mobile station of ten anterior cells according to the order in the table of neighbor cell information items prepared by the radio control station. However, the table prepared by the radio control station is made at random, and thus the foregoing technique does not always guarantee that optimal cells for communication are selected. For example, a cell that should be selected for efficient communication is not located at an anterior position in the table in some cases, which can cause degradation of communication quality and reduction of system capacity. Therefore, the Inventors conducted further investigations and found out that it was feasible to specify better cells by effecting predetermined processing on the information about cells. The present invention has been accomplished on the basis of the above-stated knowledge.

A neighbor cell notifying apparatus according to the present invention is a neighbor cell notifying apparatus for notifying a mobile station of predetermined information in a mobile communication network for implementing radio communication utilizing a plurality of cells between the mobile station and a base station, the neighbor cell notifying apparatus comprising: cell information extracting means for extracting neighbor cell information items for specifying respective neighbor cells corresponding to each of the plurality of cells; cell rank determining means for, based on the neighbor cell information items extracted, determining ranks of neighbor cell information items that the mobile station is to be notified of, in favor of neighbor cell information items about neighbor cells common to a first cell and a second cell out of the plurality of cells; and cell information notifying means for notifying the mobile station of a predetermined number of neighbor cell information items among the aforementioned neighbor cell information items on the basis of the ranks determined.

According to the neighbor cell notifying apparatus of the present invention, the mobile station is notified of the neighbor cell information items in favor of the neighbor cell information items about the neighbor cells common to the first cell and the second cell out of the plurality of cells used in the communication, based on the neighbor cell information, based on the neighbor cell information items, whereby it is feasible to minimize the degradation of communication quality and the reduction of system capacity caused by exception of these common cells from handover candidates.

Another neighbor cell notifying apparatus according to the present invention is a neighbor cell notifying apparatus for notifying a mobile station of predetermined information in a mobile communication network for implementing radio communication utilizing a plurality of cells between the mobile station and a base station, the neighbor cell notifying apparatus comprising: cell information extracting means for extracting neighbor cell information items for specifying respective neighbor cells corresponding to each of the plurality of cells; cell rank determining means for determining ranks of neighbor cell information items that the mobile station is to be notified of, based on the neighbor cell information items extracted and on priority information items preliminarily determined for the respective neighbor cells; and cell information notifying means for notifying the mobile station of a predetermined number of neighbor cell information items among the aforementioned neighbor cell information items on the basis of the ranks determined.

According to the neighbor cell notifying apparatus of the present invention, the ranks of the neighbor cell information items that the mobile station is to be notified of are determined based on the neighbor cell information items and the priority information items, whereby it is feasible to minimize the degradation of communication quality and the reduction of system capacity, by determining priorities according to environmental factors such as communication conditions of the cells.

In the neighbor cell notifying apparatus of the present invention, preferably, the cell rank determining means is configured to: delete a neighbor cell information item about one of neighbor cells common to a first cell and a second cell out of the plurality of cells, based on the neighbor cell information items extracted by the cell information extracting means; and determine the ranks of the neighbor cell information items that the mobile station is to be notified of, based on the neighbor cell information items after the deletion, and on the priority information items preliminarily determined for the respective neighbor cells. Since the neighbor cell information items about the common neighbor cell is deleted, it is feasible to more efficiently determine the ranks of the neighbor cell information items that the mobile station is to be notified of.

In the neighbor cell notifying apparatus of the present invention, preferably, the priority information items are determined based on handover rates of the respective neighbor cells. The handover rates are correlated with communication quality and, for example, if cells with statistically high handover rates are excepted from handover candidates, the communication quality will degrade relatively heavily. Therefore, a preferential handover to such a cell can minimize the degradation of communication quality and the reduction of system capacity.

In the neighbor cell notifying apparatus of the present invention, preferably, the priority information items are determined based on numbers of mounted channels in the respective neighbor cells. The numbers of mounted channels are correlated with communication quality and, for example, by setting high priorities for cells with relatively large number of mounted channels, it is feasible to minimize the degradation of communication quality and the reduction of system capacity.

A neighbor cell notifying method according to the present invention is a neighbor cell notifying method of notifying a mobile station of predetermined information in a mobile communication network for implementing radio communication utilizing a plurality of cells between the mobile station and a base station, the neighbor cell notifying method comprising: an extracting step wherein cell information extracting means extracts neighbor cell information items for specifying respective neighbor cells corresponding to each of the plurality of cells; a determining step wherein, based on the neighbor cell information items extracted, cell rank determining means determines ranks of neighbor cell information items that the mobile station is to be notified of, in favor of neighbor cell information items about neighbor cells common to a first cell and a second cell out of the plurality of cells; and a notifying step wherein cell information notifying means notifies the mobile station of a predetermined number of neighbor cell information items among the aforementioned neighbor cell information items on the basis of the ranks determined.

According to the neighbor cell notifying method of the present invention, the mobile station is notified of the neighbor cell information items in favor of the neighbor cell information items about the neighbor cells common to the first cell and the second cell out of the plurality of cells used in the communication, based on the neighbor cell information items, whereby it is feasible to minimize the degradation of communication quality and the reduction of system capacity caused by exception of these common cells from handover candidates.

Another neighbor cell notifying method according to the present invention is a neighbor cell notifying method of notifying a mobile station of predetermined information in a mobile communication network for implementing radio communication utilizing a plurality of cells between the mobile station and a base station, the neighbor cell notifying method comprising: an extracting step wherein cell information extracting means extracts neighbor cell information items for specifying respective neighbor cells corresponding to each of the plurality of cells; a determining step wherein cell rank determining means determines ranks of neighbor cell information items that the mobile station is to be notified of, based on the neighbor cell information items extracted and on priority information items preliminarily determined for the respective neighbor cells; and a notifying step wherein cell information notifying means notifies the mobile station of a predetermined number of neighbor cell information items among the aforementioned neighbor cell information items on the basis of the ranks determined.

According to the neighbor cell notifying method of the present invention, the ranks of the neighbor cell information items that the mobile station is to be notified of are determined based on the neighbor cell information items and the priority information items, whereby it is feasible to minimize the degradation of communication quality and the reduction of system capacity, by determining priorities according to environmental factors such as communication conditions of the cells.

In the neighbor cell notifying method of the present invention, preferably, the cell rank determining means in the determining step is configured to: delete a neighbor cell information item about one of neighbor cells common to a first cell and a second cell out of the plurality of cells, based on the neighbor cell information items extracted by the cell information extracting means; and determine the ranks of the neighbor cell information items that the mobile station is to be notified of, based on the neighbor cell information items after the deletion, and on the priority information items preliminarily determined for the respective neighbor cells. Since the neighbor cell information about the common neighbor cell is deleted, it is feasible to more efficiently determine the ranks of the neighbor cell information items that the mobile station is to be notified of.

In the neighbor cell notifying method of the present invention, preferably, the priority information items are determined based on handover rates of the respective neighbor cells. The handover rates are correlated with communication quality and, for example, if cells with statistically high handover rates are excepted from handover candidates, the communication quality will degrade relatively heavily. Therefore, a preferential handover to such a cell can minimize the degradation of communication quality and the reduction of system capacity.

In the neighbor cell notifying method of the present invention, preferably, the priority information items are determined based on numbers of mounted channels in the respective neighbor cells. The numbers of mounted channels are correlated with communication quality and, for example, by setting high priorities for cells with relatively large number of mounted channels, it is feasible to minimize the degradation of communication quality and the reduction of system capacity.

BRIEF DESCRIPTION OF THE DRAWINGS

The present invention may be more readily described with reference to the accompanying drawings, in which:

FIG. 3A is an illustration for explaining a specific example of the neighbor cell information;

FIG. 3B is an illustration for explaining a specific example of the neighbor cell information;

FIG. 4A is an illustration for explaining a specific example of the neighbor cell information;

FIG. 4B is an illustration for explaining a specific example of the neighbor cell information;

FIG. 6A is an illustration for explaining a specific example of the neighbor cell information;

FIG. 6B is an illustration for explaining a specific example of the neighbor cell information;

FIG. 7A is an illustration for explaining a specific example of the neighbor cell information;

FIG. 7B is an illustration for explaining a specific example of the neighbor cell information;

FIG. 7C is an illustration for explaining a specific example of the neighbor cell information;

FIG. 9A is an illustration for explaining a specific example of the neighbor cell information;

FIG. 9B is an illustration for explaining a specific example of the neighbor cell information; and FIG. 9C is an illustration for explaining a specific example of the neighbor cell information.

DESCRIPTION OF THE PREFERRED EMBODIMENTS

The knowledge of the present invention can be readily understood in view of the following detailed description with reference to the accompanying drawings presented for only the illustrative purpose. Subsequently, embodiments of the present invention will be described with reference to the accompanying drawings. The same portions will be denoted by the same reference symbols as much as possible, without redundant description thereof.

Figure 1:
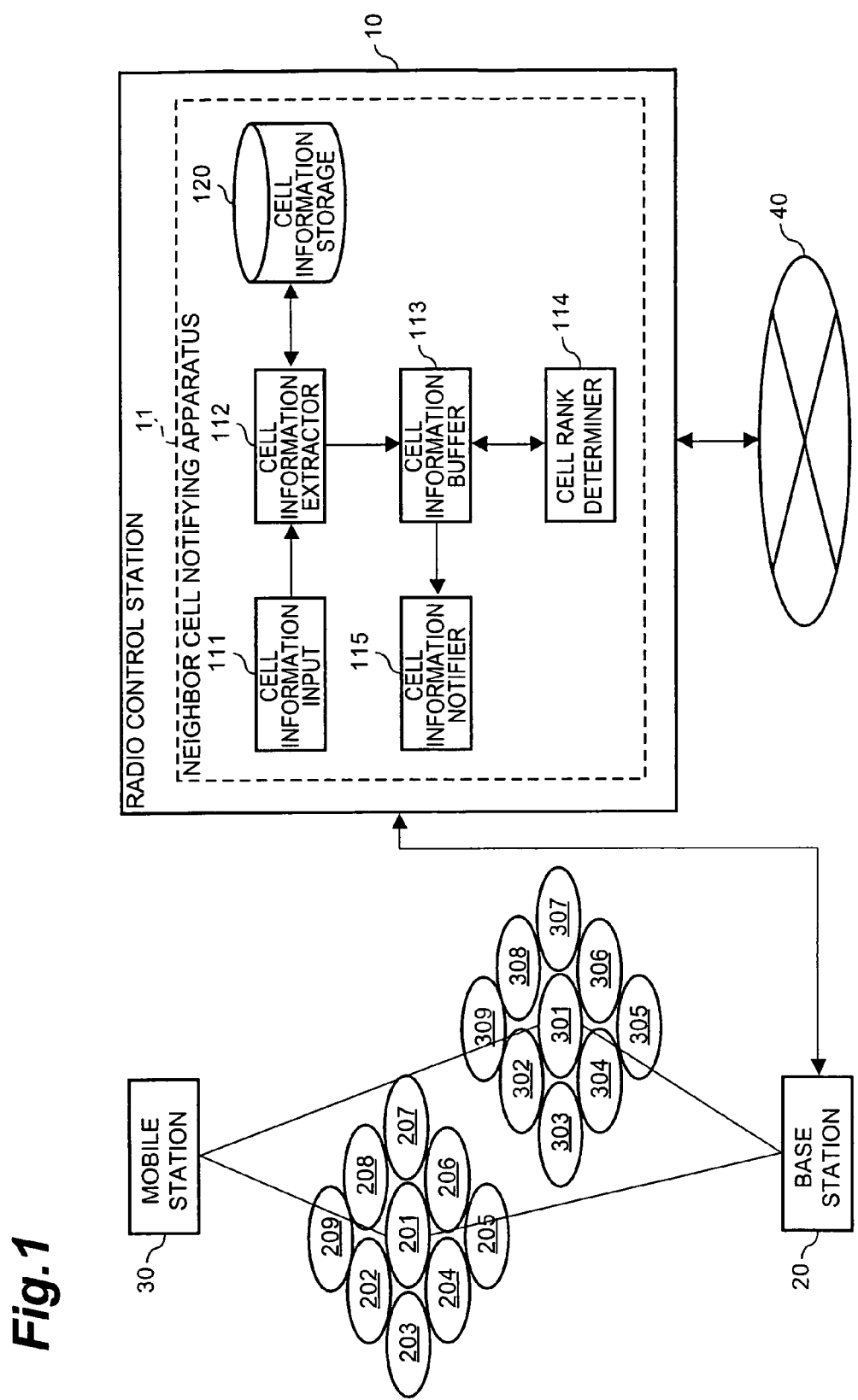
FIG. 1 is an illustration for explaining a neighbor cell notifying apparatus as an embodiment of the present invention.

The neighbor cell notifying apparatus as an embodiment of the present invention will be described below with reference to FIG. 1. FIG. 1 is an illustration showing part of a mobile communication network including the neighbor cell notifying apparatus 11, for explaining the neighbor cell notifying apparatus 11. The neighbor cell notifying apparatus 11 is included in radio control station 10. The radio control station 10 is connected to base station 20 and to core network 40, and constitutes part of the mobile communication network adopting the W-CDMA (Wideband-Code Division Multiple Access) system, or the UMTS (Universal Mobile Telecommunications System). Mobile station 30 is configured to communicate with core network 40 via base station 20 and radio control station 10. In the present embodiment there are mobile station 30, base station 20, and radio control station 10 one each, for convenience' sake of description, but in general there exist a plurality of such stations in a service area.

Cells A201–A209 and cells B301–B309 are a plurality of cells in the mobile communication network and, in the case of the present embodiment, the mobile station 30 and base station 20 are in a state of DHO (Diversity HandOver) using cell A201 and cell B301. The cells A202–A209 exist as neighbor cells around the cell A201, and the cells B302–B309 as neighbor cells around the cell B301. The names of these cells herein are given for convenience' sake and, for example, if two cells have different names but an identical cell ID, they will be regarded as an identical cell for the system.

The radio control station 10 includes the neighbor cell notifying apparatus 11. The neighbor cell notifying apparatus 11 is physically constructed as a computer system including a CPU (central processing unit), memories such as RAM and ROM, a storage device such as a hard disk, and input and output devices such as a keyboard, a display, and so on. The neighbor cell notifying apparatus 11 itself may be constructed as a single computer system, or it may also be constructed as part of another computer system in the radio control station 10.

The neighbor cell notifying apparatus 11 includes the following functional components: cell information input part 111, cell information extracting part (cell information extracting means) 112, cell information buffer part 113, cell rank determining part (cell rank determining means) 114, cell information notifying part (cell information notifying means) 115, and cell information storage part 120. Subsequently, each of the components will be described below in detail.

The cell information input part 111 is a portion that acquires information about cells used in communication of mobile station 30 with base station 20 and that outputs the acquired information to cell information extracting part 112. In the example of FIG. 1, the mobile station 30 is in communication using the cell A201 and cell B301, and thus the cell information input part 111 acquires the information, for example, about cell IDs specifying the cells A201 and B301 and outputs the information to the cell information extracting part 112.

The cell information extracting part 112 is a portion that extracts the neighbor cell information items concerning the cells used in the communication of the mobile station 30, based on the information about the cells from the cell information input part 111. More specifically, the cell information extracting part 112 extracts the neighbor cell information items stored in the cell information storage part 120, based on the information from the cell information input part 111. Here the cell information storage part 120 stores as system data the information about each cell, and the information for specifying each cell. The cell information extracting part 112 outputs the extracted neighbor cell information items to cell information buffer part 113. The cell information buffer part 113 is a portion that temporarily saves the output neighbor cell information items.

The cell rank determining part 114 is a portion that performs a process of editing the neighbor cell information items stored in the cell information buffer part 113 and returning the edited neighbor cell information items to the cell information buffer part 113. There are a variety of modes for the cell rank determining part 114 to edit the neighbor cell information items. An example is as follows: the cell rank determining part 114 performs the editing in favor of the neighbor cell information items about neighbor cells common to a first cell and a second cell out of the plurality of cells used in communication of the mobile station 30, based on the neighbor cell information items extracted by the cell information extracting part 112. Another example is that the cell rank determining part 114 performs the editing based on the neighbor cell information items extracted by the cell information extracting part 112 and on priority information items predetermined for the respective neighbor cells. Still another example is that the cell rank determining part 114 deletes one of duplicate neighbor cell information items, based on the neighbor cell information items extracted by the cell information extracting part 112, and then performs the editing based on the neighbor cell information items after the deletion and on the priority information items predetermined for the respective neighbor cells. The details of these will be described later.

The cell information notifying part 115 is a portion that notifies the mobile station 30 of the neighbor cell information items as edited by the cell rank determining part 114 and stored in the cell information buffer part 113. On the occasion of performing this notification, if the neighbor cell information items stored in the cell information buffer part 113 are over the notification and monitoring performance of the mobile station 30, the cell information notifying part 115 notifies the mobile station of the neighbor cell information items within the scope not exceeding the performance.

Figure 2:
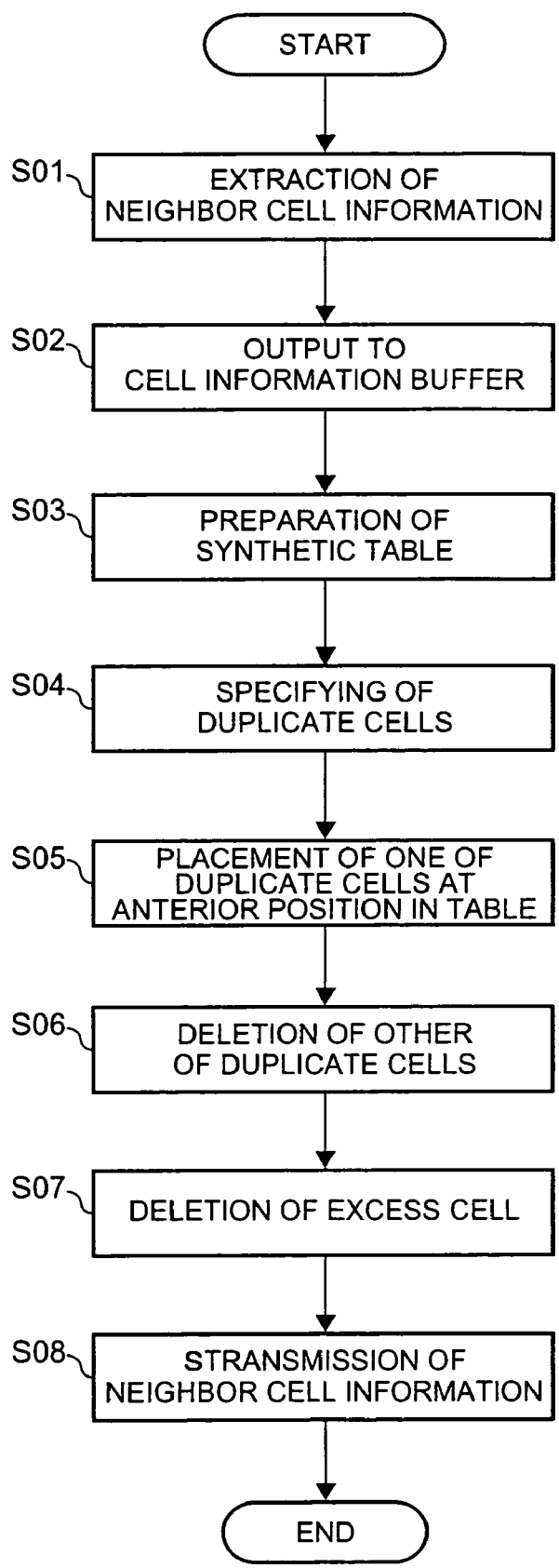
FIG. 2 is an illustration for explaining a method of notifying the mobile station of the neighbor cell information, using the neighbor cell notifying apparatus of FIG. 1.

Subsequently, a first method for the neighbor cell notifying apparatus 11 to notify the mobile station 30 of the neighbor cell information items will be described with reference to FIG. 2. The cell information extracting part 112 extracts the neighbor cell information items stored in the cell information storage part 120 in accordance with the output from the cell information input part 111 (step S01). Where the information from the cell information input part 111 is one about cell A201 and cell B301, the cell information extracting part 112 outputs to store the information about the cells A201–A209 and about the cells B301–B309 as neighbor cell information items in the table format as shown in FIGS. 3A and 3B, into the cell information buffer part 113 (step S02).

After the neighbor cell information items are stored in the cell information buffer part 113, the cell rank determining part 114 prepares a synthetic table (step S03). In the present embodiment, the synthetic table is prepared by combining the neighbor cell information items about the cell A201 (cf. FIG. 3A) and the neighbor cell information items about the cell B301 (cf. FIG. 3B). A method of preparing this synthetic table can be selected from a variety of methods; in the case of the present embodiment, as shown in FIG. 4A, the synthetic table is prepared by alternately combining the neighbor cell information items about the cell A201 and the neighbor cell information items about the cell B301.

The cell rank determining part 114 specifies duplicate neighbor cells, based on the synthetic table shown in FIG. 4A (step S04). In the example of FIG. 4A, each of the following pairs has an identical cell ID and is thus duplicate: cell A201 and cell B307; cell B301 and cell A207; cell A206 and cell B306; cell A208 and cell B308.

The cell rank determining part 114 places one of neighbor cells in each duplicate pair specified at step S04, at an anterior position in the table (step S05). Namely, it places the cell A201, cell B301, cell A206, and cell A208 at respective anterior positions in the table. The cell rank determining part 114 deletes the other of neighbor cells in each duplicate pair specified at step S04 (step S06). Namely, the cell rank determining part 114 deletes each of the cells B307, A207, B306, and B308 and stores the resultant table into the cell information buffer part 113.

The cell information notifying part 115 deletes excess from the neighbor cell information items stored in the cell information buffer part 113 by the cell rank determining part 114 at step S06 (step S07). The cell information notifying part 115 notifies the mobile station 30 of the neighbor cell information items (cf. FIG. 4B) obtained after these processes (step S08).

Figure 5:
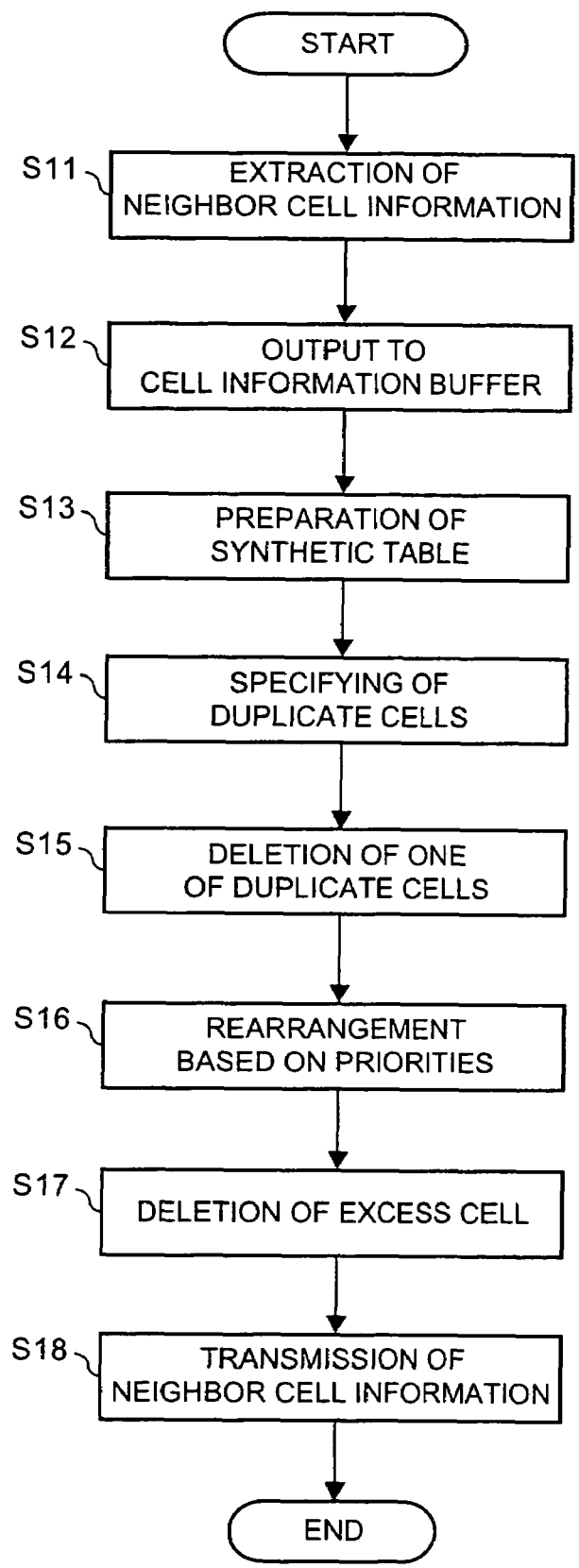
FIG. 5 is an illustration for explaining a method of notifying the mobile station of the neighbor cell information, using the neighbor cell notifying apparatus of FIG. 1.

Subsequently, a second method for the neighbor cell notifying apparatus 11 to notify the mobile station 30 of the neighbor cell information items will be described with reference to FIG. 5. The cell information extracting part 112 extracts the neighbor cell information items stored in the cell information storage part 120, according to the output from the cell information input part 111 (step S11). Where the information from the cell information input part 111 is one about the cells A201 and B301, it outputs to store the information about the cells A201–A209 and about the cells B301–B309 as neighbor cell information items in the table format as shown in FIGS. 6A and 6B, into the cell information buffer part 113 (step S12).

In the second method, each cell is given a priority. In the example of FIGS. 6A and 6B, the cell A201 is given the priority of "1," and the cell A202 the priority of "2;" this indicates that the priority of cell A201 is higher than that of cell A202. For determining the priorities, high priorities can be given to cells with statistically high handover rates from a cell of interest or to cells with relatively large number of mounted channels.

After the neighbor cell information items are stored in the cell information buffer part 113, the cell rank determining part 114 prepares a synthetic table (step S13). In the present embodiment, the synthetic table is prepared by combining the neighbor cell information items about the cell A201 (cf. FIG. 6A) and the neighbor cell information items about the cell B301 (cf. FIG. 6B). A method of preparing this synthetic table can be selected from a variety of methods and in the case of the present embodiment, as shown in FIG. 7A, the synthetic table is prepared by alternately combining the neighbor cell information items about the cell A201 and the neighbor cell information items about the cell B301.

The cell rank determining part 114 specifies duplicate neighbor cells, based on the synthetic table shown in FIG. 7A (step S14). In the example of FIG. 7A, each of the following pairs has an identical cell ID and is thus duplicate: cell A201 and cell B307; cell B301 and cell A207; cell A206 and cell B306; cell A208 and cell B308.

The cell rank determining part 114 deletes one of neighbor cells in each duplicate pair specified at step S14 (step S15). Namely, it deletes each of the cells B307, A207, B306, and B308 to obtain the table as shown in FIG. 7B. The cell rank determining part 114 rearranges the table of FIG. 7B on the basis of the order of priorities of the respective cells and stores the resultant table into the cell information buffer part 113 (step S16).

The cell information notifying part 115 deletes excess from the neighbor cell information items stored in the cell information buffer part 113 by the cell rank determining part 114 at step S16 (step S17). The cell information notifying part 115 notifies the mobile station 30 of the neighbor cell information items (cf. FIG. 7C) obtained after these processes (step S18).

Figure 8:
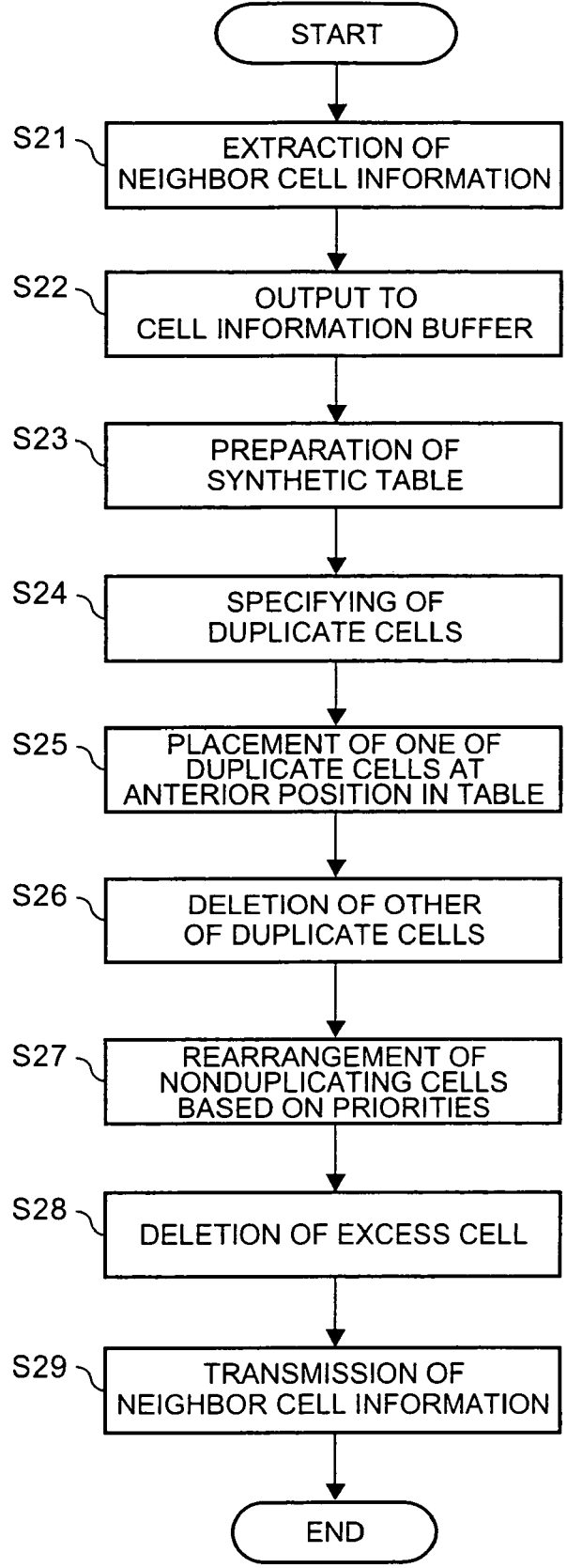
FIG. 8 is an illustration for explaining a method of notifying the mobile station of the neighbor cell information, using the neighbor cell notifying apparatus of FIG. 1.

Subsequently, a third method for the neighbor cell notifying apparatus 11 to notify the mobile station 30 of the neighbor cell information items will be described with reference to FIG. 8. The cell information extracting part 112 extracts the neighbor cell information items stored in the cell information storage part 120, according to the output from the cell information input part 111 (step S21). Where the information from the cell information input part 111 is one about the cells A201 and B301, the cell information extracting part 112 outputs to store the information about the cells A201–A209 and about the cells B301–B309 as neighbor cell information items in the table format as shown in FIGS. 6A and 6B, into the cell information buffer part 113 (step S22). In the third method, each cell is given a priority, just as in the case of the second method.

After the neighbor cell information items are stored in the cell information buffer part 113, the cell rank determining part 114 prepares a synthetic table (step S23). In the present embodiment, the synthetic table is prepared by combining the neighbor cell information items about the cell A201 (cf. FIG. 6A) and the neighbor cell information items about the cell B301 (cf. FIG. 6B). A method of preparing this synthetic table can be selected from a variety of methods and, in the present embodiment, as shown in FIG. 9A, the synthetic table is prepared by alternately combining the neighbor cell information items about the cell A201 and the neighbor cell information items about the cell B301.

The cell rank determining part 114 specifies duplicate neighbor cells, based on the synthetic table shown in FIG. 9A (step S24). In the example of FIG. 9A, each of the following pairs has an identical cell ID and is thus duplicate: cell A201 and cell B307; cell B301 and cell A207; cell A206 and cell B306; cell A208 and cell B308.

The cell rank determining part 114 places one of neighbor cells in each duplicate pair specified at step S24, at an anterior position in the table (step S25). Namely, it places the cells A201, B301, A206, and A208 at respective anterior positions in the table. The cell rank determining part 114 deletes the other of neighbor cells in each duplicate pair specified at step S24 (step S26). Namely, it deletes each of the cells B307, A207, B306, and B308. The cell rank determining part 114 rearranges the order of cells except for those located at the anterior positions in the table at step S25, based on their priorities, and stores the resultant table as shown in FIG. 9B, into the cell information buffer part 113 (step S27).

The cell information notifying part 115 deletes excess from the neighbor cell information items stored in the cell information buffer part 113 by the cell rank determining part 114 at step S27 (step S28). The cell information notifying part 115 notifies the mobile station 30 of the neighbor cell information items (cf. FIG. 9C) obtained after these processes (step S29).

In the present embodiment, based on the neighbor cell information items, the ranks of the neighbor cell information items that the mobile station 30 is to be notified of are determined in favor of the neighbor cell information items about the neighbor cells common to the first cell (cell A201) and the second cell (cell B301) out of the plurality of cells used in the communication, whereby it is feasible to minimize the degradation of communication quality and the reduction of system capacity caused by the exception of these common cells from handover candidates.

In the present embodiment, since the ranks of the neighbor cell information items that the mobile station 30 is to be notified of are determined based on the neighbor cell information items and the priority information items, it is feasible to minimize the degradation of communication quality and the reduction of system capacity, by determining the priories according to the environmental factors such as the communication conditions of the cells.

What is claimed is:

1. A neighbor cell notifying apparatus for notifying a mobile station of predetermined information in a mobile communication network for implementing radio communication utilizing a plurality of cells between the mobile station and a base station, the neighbor cell notifying apparatus comprising:

cell information extracting means for extracting neighbor cell information items identifying respective neighbor cells of each of said plurality of cells;

cell rank determining means for ranking the neighbor cell information items that the mobile station is to be notified of, based on the extracted neighbor cell information items and on predetermined priority information for the respective neighbor cells; and cell information notifying means for notifying the mobile station of a predetermined number of neighbor cell information items among said neighbor cell information items based on the determined ranking.

2. The neighbor cell notifying apparatus according to claim 1, wherein the cell rank determining means is configured to:

delete neighbor cell information items of one of the neighbor cells common to a first cell and a second cell out of the plurality of cells, based on the neighbor cell information items extracted by the cell information extracting means; and rank the neighbor cell information items that the mobile station is to be notified of, based on the neighbor cell information items after the deletion, and on the predetermined priority information for the respective neighbor cells.

3. The neighbor cell notifying apparatus according to claim 1 or 2, wherein the predetermined priority information is determined based on handover rates of the respective neighbor cells.

4. The neighbor cell notifying apparatus according to claim 1 or 2, wherein the predetermined priority information is determined based on numbers of utilized channels in the respective neighbor cells.

5. A neighbor cell notifying method of notifying a mobile station of predetermined information in a mobile communication network for implementing radio communication utilizing a plurality of cells between the mobile station and a base station, the neighbor cell notifying method comprising:

extracting neighbor cell information items identifying respective neighbor cells of each of said plurality of cells;

ranking the neighbor cell information items that the mobile station is to be notified of, based on the extracted cell information items and on predetermined priority information for the respective neighbor cells; and notifying the mobile station of a predetermined number of neighbor cell information items among said neighbor cell information items based on the determined ranking.

6. A neighbor cell notifying apparatus for notifying a mobile station of predetermined information in a mobile communication network for implementing radio communication utilizing a plurality of cells between the mobile station and a base station, the neighbor cell notifying apparatus comprising:

cell information extracting means for extracting neighbor cell information items identifying respective neighbor cells of each of said plurality of cells, including a first cell and a second cell utilized by the mobile station for communication with the base station;

cell rank determining means for, based on the extracted neighbor cell information items, ranking the neighbor cell information items that the mobile station is to be notified of, wherein the cell rank determining means favors neighbor cell information items common to the first cell and the second cell out of the plurality of cells; and cell information notifying means for notifying the mobile station of a predetermined number of neighbor cell information items among said neighbor cell information items based on the determined ranking.

7. A neighbor cell notifying method of notifying a mobile station of predetermined information in a mobile communication network for implementing radio communication utilizing a plurality of cells between the mobile station and a base station, the neighbor cell notifying method comprising:

extracting neighbor cell information items identifying respective neighbor cells of each of said plurality of cells, including a first cell and a second cell utilized by the mobile station for communication with the base station;

ranking, based on the extracted neighbor cell information items, the neighbor cell information items that the mobile station is to be notified of, by favoring neighbor cell information items that are common to the first cell and the second cell out of the plurality of cells; and a notifying the mobile station of a predetermined number of neighbor cell information items among said neighbor cell information items based on the determined ranking.

* * * * *